US012663824B2

(12) United States Patent
Collins et al.

(10) Patent No.: US 12,663,824 B2
(45) Date of Patent: Jun. 23, 2026

(54) DIGITALLY CONTROLLED, DIRECT SLEW RATE ENHANCEMENT FOR LDOS

(71) Applicant: Endura IP Holdings Ltd, George Town (KY)

(72) Inventors: Diarmuid Collins, Arran Quay (IE); Aidan Keady, Arran Quay (IE); Gol Nagdebe, San Diego, CA (US)

(73) Assignee: Endura IP Holdings Ltd., George Town (KY)

(*) Notice: Subject to any disclaimer, the term of this patent is extended or adjusted under 35 U.S.C. 154(b) by 138 days.

(21) Appl. No.: 18/524,334

(22) Filed: Nov. 30, 2023

(65) Prior Publication Data

US 2025/0181094 A1 Jun. 5, 2025

(51) Int. Cl.
*G05F 1/575* (2006.01)

(52) U.S. Cl.
CPC .................................... *G05F 1/575* (2013.01)

(58) Field of Classification Search
CPC .......... G05F 1/575; G05F 1/563; G05F 1/565; G05F 1/569; G05F 1/571; G05F 1/573; G05F 1/5735; G05F 1/59; G05F 1/595
See application file for complete search history.

(56) References Cited

U.S. PATENT DOCUMENTS 6,452,854 B1 * 9/2002 Kato ...................... G11C 5/147 365/210.11
11,762,408 B1 * 9/2023 Ghosh ....................... G05F 1/56 327/540
2019/0302820 A1 * 10/2019 Yasusaka ................ G05F 1/575

* cited by examiner

*Primary Examiner* — Nguyen Tran
(74) *Attorney, Agent, or Firm* — KPPB LLP

(57) ABSTRACT

Slew rate of an LDO power regulator is enhanced using a bypass device outside of a control loop of the LDO power regulator. The bypass device provides current to a load in parallel to the LDO power regulator in response to transient events. The bypass device includes digital control circuitry for controlling provision of current to the load. In some embodiments the digital control circuitry provides logic outputs using threshold levels based on desired regulated output voltages of the LDO power regulator.

18 Claims, 6 Drawing Sheets

DIGITALLY CONTROLLED, DIRECT SLEW RATE ENHANCEMENT FOR LDOS

FIELD OF THE INVENTION

The present invention relates generally to power management for semiconductor devices, and more particularly to a low dropout power regulator with digitally controlled slew rate enhancement.

BACKGROUND OF THE INVENTION

Integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times. This may be particularly true for those chips integrating multiple components that may be considered a system-on-chip (SOC). And very often the provision of power is preferred to be at very specific levels and without undue noise.

To this end, low dropout (LDO) power regulators may be used to sub-regulate power provided from a main supply.

Unfortunately, under transient conditions, for example when power requirements for supplied circuitry rapidly changes, LDO power regulators may not respond to those changes with a desired sufficient rapidity. Moreover, control circuitry to increase speed of response of LDO power regulators may be complex, particularly when the control circuitry modifies closed loop operation of the LDO power regulator.

BRIEF SUMMARY OF THE INVENTION

Some embodiments provide an LDO power regulator with a digitally controlled bypass switch in parallel to an output of the LDO.

Some embodiments provide a linear drop out (LDO) power regulator with digitally controlled slew rate enhancement, comprising: an LDO power regulator including a control and a pass device, the pass device coupled between a source of power and a load, the control configured to operate the pass device based on a first signal indicative of voltage applied to the load; a bypass switch coupled between the source of power and the load, in parallel to the pass device; and a digital control to operate the bypass switch, based on a second signal indicative of voltage applied to the load. In some embodiments the first signal indicative of voltage applied to the load and the second signal indicative of voltage applied to the load are the same signal. In some embodiments the control is additionally configured to operate the pass device to apply a predetermined desired voltage to the load, and wherein the digital control includes logic gates having threshold values based on the predetermined desired voltage. In some embodiments the digital control includes logic gates having threshold values of nominally half of the predetermined desired voltage. In some embodiments at least one of the logic gates is configured to receive the signal from the node between the pass device and the load. In some embodiments the at least one of the logic gates is an inverter. In some embodiments the bypass switch comprises at least one transistor, operation of the transistor being based on operation of the logic gates. Some embodiments further comprise a level shifter, the level shifter in a signal pathway between the logic gates and the at least one transistor. In some embodiments the level shifter comprises at least one logic gate with a threshold value based on a voltage level of the source of power. In some embodiments provision of power from the LDO power regulator to the load is enabled by a power enable control signal, and the digital control to operate the bypass switch is further configured to operate the pass device based on the power enable control signal.

Some embodiments provide a linear drop out (LDO) power regulator with digitally controlled slew rate enhancement, comprising: an LDO power regulator including a pass device and control circuitry, the pass device to be coupled between a source of power and a load, the error amplifier coupled to an output of the pass device and reference voltage circuitry, the control circuitry configured to operate the pass device based on a difference between a signal provided by the reference voltage circuitry and a signal based on the output of the pass device; a bypass switch, to be coupled between the source of power and the load, in parallel to the pass device, an output of the bypass switch being coupled to an output of the pass device; and a digital control to operate the bypass switch, the digital control including at least one logic gate with an input coupled to the output of the bypass switch, the digital control configured to operate the bypass switch based on an output of the at least one logic gate. In some embodiments at least one transistor of the at least one logic gate is coupled for biasing to a different power source line than the source of power to be coupled to the bypass switch. In some embodiments the at least one of the logic gates is an inverter. In some embodiments further comprise a level shifter, the level shifter in a signal pathway between the inverter and bypass switch. In some embodiments the bypass switch comprises at least one transistor, a gate of the at least one transistor coupled to an output of the level shifter. Some embodiments further comprise an AND gate in a signal path between the inverter and the bypass switch, the AND gate having a first input coupled to a power enable control line and a second input coupled to an output of the inverter. In some embodiments the AND gate includes at least one transistor coupled for biasing to a different power source line than the source of power to be coupled to the bypass switch, and the AND gate precedes the level shifter in the signal path between the inverter and the bypass switch. In some embodiments the level shifter includes at least one transistor coupled for biasing to a same power source line as the bypass switch.

These and other aspects of the invention are more fully comprehended upon review of this disclosure.

DETAILED DESCRIPTION

Figure 1A:
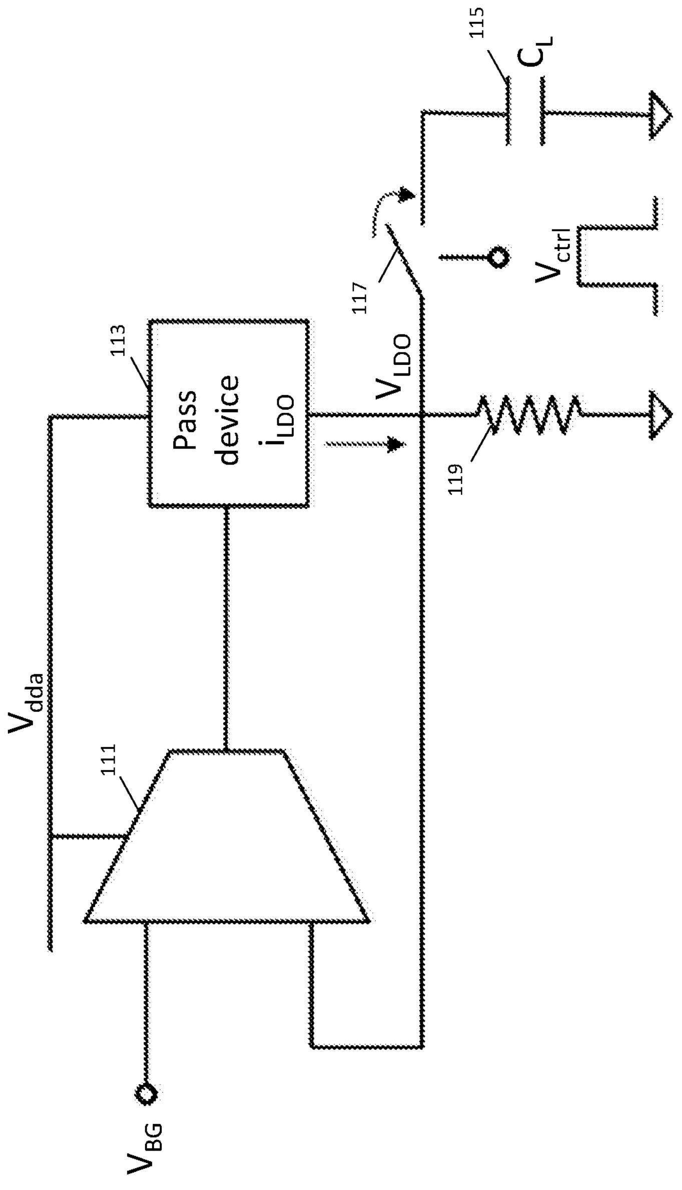
FIG. 1A is a semi-block diagram, semi-schematic of an LDO power regulator.

FIG. 1A shows an LDO power regulator. The LDO power regulator receives a voltage $V_{dda}$ from a power source and provides regulated power to a load. The load in FIG. 1A is shown as a capacitive load $C_L$ 115, with it being understood that the load will generally include resistive portions as well.

The LDO power regulator of FIG. 1A includes a pass device 113. The pass device may be, for example, a transistor, for example a power FET, with for example its drain terminal receiving the voltage $V_{dda}$, and its source terminal providing the regulated output to the load. Control of the pass device comes from an operation transconductance amplifier (OTA).

The OTA compares voltage of a reference voltage, for example VBG which may be provided by a bandgap reference generator, and a voltage provided to the load by the pass device. The OTA is typically termed an error amplifier, with the error amplifier part of a negative feedback loop controlling operation of the pass device. As also would be understood, the OTA may be provided a scaled version of the voltage provided by the load. In this regard, FIG. 1A shows the output of the pass device coupled, in parallel to the load, to ground through a pull-down resistor 119. In some embodiments the pull-down resistor may be replaced by a resistors in series forming a voltage ladder, with a node in the voltage ladder providing the voltage for comparison by the OTA 111.

The LDO power regulator of FIG. 1A also includes a switch 117 coupling the LDO power regulator to the load. The switch 117 may be controlled by a power enable control signal. The power enable control signal may be provided by other circuitry, for example processor circuitry that determines when the load should be provided power. With the switch in the open position, no power is applied to the load from the LDO power regulator. Conversely, with the switch in the closed position, power is applied to the load from the LDO power regulator. In various embodiments the switch may be otherwise positioned or implemented, with for example in some embodiments the "switch" or its control signal disabling various portions of the LDO power regulator, for example the error amplifier.

Figure 1B:
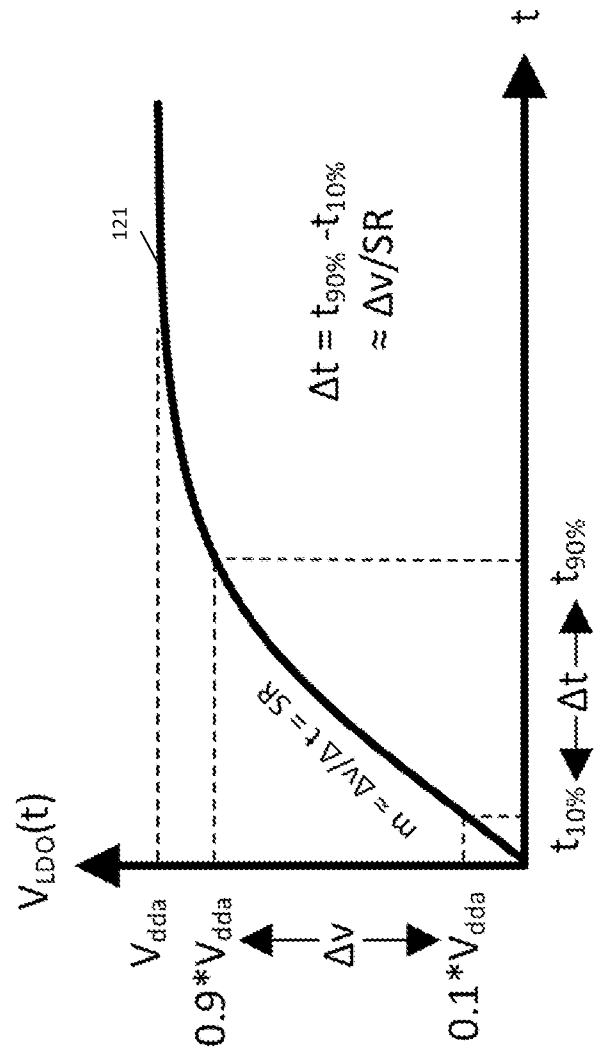
FIG. 1B is a chart showing a transient response of the LDO power regulator of FIG. 1A.

FIG. 1B provides a chart showing a response to the transient event of the switch closing for the device of FIG. 1A. When the switch transitions from an open state to a closed state, current flows to the load, charging the capacitive load. The chart shows output voltage 121 applied to the load over time, with the switch being closed at a time to. The transient event of the switch closing may be considered a large transient event, as power to the load increases from about or effectively zero to the regulated amount. For such large transient events, the settling time to the transient event may include a period in which voltage applied to the load rises as a function of peak current divided by capacitance at the output of the LDO (e.g., capacitance of the load), and a period in which small signal settling occurs.

The period in which voltage applied to the load rises as a function of peak current divided by capacitance at the output of the LDO generally occurs when the voltage is approximately less than or equal to 90% of the steady state voltage. The rate of change during this period may be considered a slew rate (SR), and have a value $$SR=dV/dt=I_p/C_L \quad (1)$$

The period in which small signal settling occurs is when the voltage is within about 90% of the steady state voltage. The rate of change during this period may be considered as being determined by the LDO closed loop bandwidth BWCL, as indicated by $$V_0(t)=V(1-\exp(t*BW_{CL}) \quad (2)$$

As an example, one may assume a 50 pF capacitive load, a regulated load of 1.2 V, and a desire to achieve a ramp from 10% to 90% of the steady state output voltage in 35 ns. In such circumstances, eqn. (1) informs that a peak current $I_p$ of at least 1.4 mA is necessary.

Unfortunately, a pass device for output currents greater than about 0.5 mA generally poses design complications. For example, a pass device may be output pole dominant, and larger pass devices may significantly pull in their non-dominant pole. Coincidently, loop gain bandwidth (GBW) would also need to be pulled in, generally at a cost to area and small signal settling time. Alternatively, buffered compensation could be used to push out the non-dominant pole. But use of buffered compensation leads to increased complexity, including an increase to the system order and possible addition of a further feedback loop.

Figure 2:
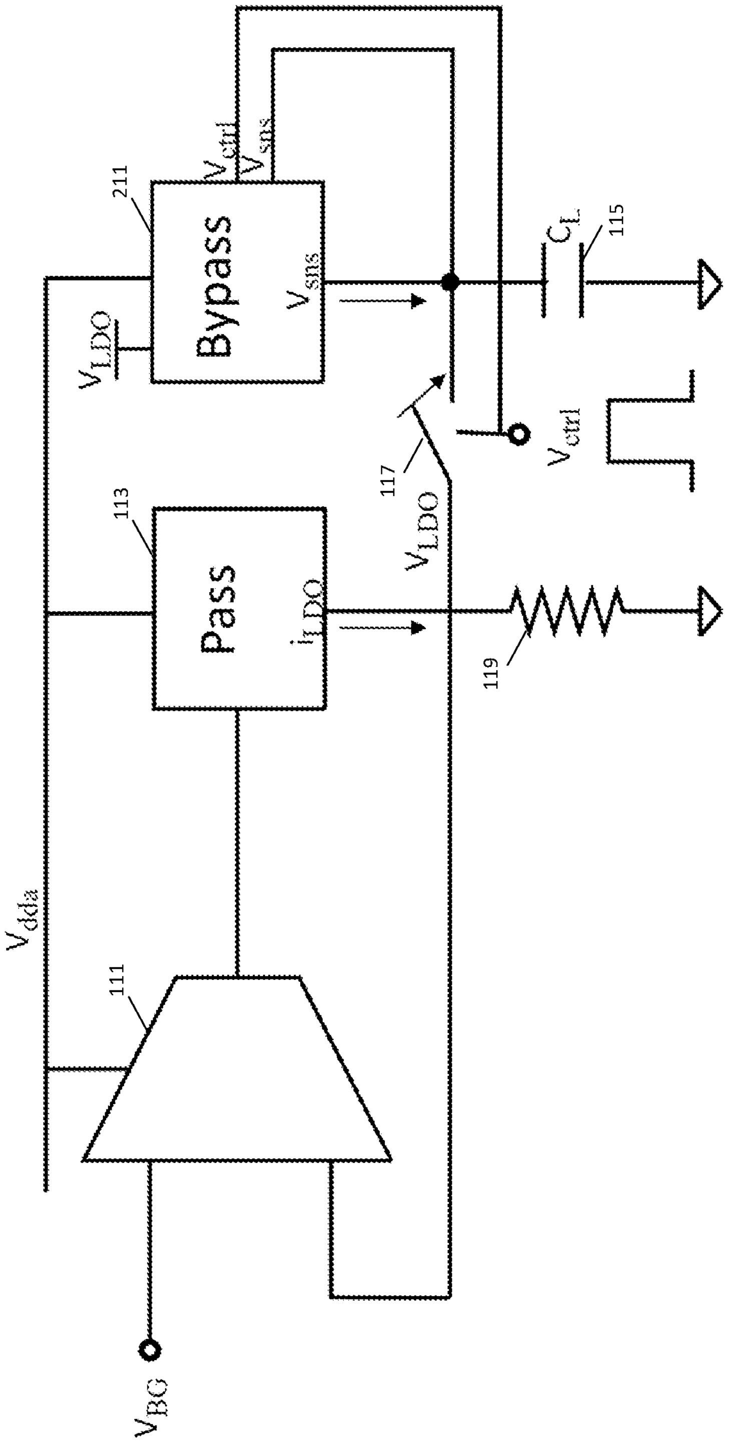
FIG. 2 is a semi-block diagram, semi-schematic of an embodiment of an LDO power regulator with a digitally controlled bypass switch, in accordance with aspects of the invention.

FIG. 2 is a semi-block diagram, semi-schematic of an embodiment of an LDO power regulator with a digitally controlled bypass switch, in accordance with aspects of the invention. The LDO power regulator of FIG. 2 may be either on-chip, for example as part of a system-on-chip (SOC), or off-chip, in various embodiments.

As with the LDO power regulator of FIG. 1A, the LDO power regulator of FIG. 2 receives a voltage $V_{dda}$ from a power source and provides regulated power to a load. In some embodiments the power source is a battery. In some embodiments the power source is another power regulator, for example a switching power regulator (which may receive its source of power from a battery). Again, the load in FIG. 2 is shown as the capacitive load CL 115, with it being understood that the load will generally include resistive portions as well.

A pass device 113 is coupled between $V_{dda}$ and the load. The pass device may be, for example, a transistor, for example a power FET, with for example its drain terminal receiving the voltage $V_{dda}$, and its source terminal providing the regulated output to the load. Once again, control of the pass device comes from an OTA as in FIG. 1A. The OTA compares voltage of a reference voltage, for example VBG which may be provided by a bandgap reference, and a voltage provided to the load by the pass device. As would be understood, the OTA may be provided a scaled version of the voltage provided by the load. The OTA serves as an error amplifier, driving the pass device to provide current such that the voltage applied to the load reaches its desired voltage.

As also would be understood, the OTA may be provided a scaled version of the voltage provided by the load. In this regard, FIG. 2 also shows the output of the pass device coupled to ground through a pull-down resistor 119, with the pull-down resistor in parallel to the load. In some embodiments the pull-down resistor may be replaced by resistors in series forming a voltage ladder, with a node in the voltage ladder providing the voltage for comparison by the OTA 111.

A switch 117 couples the output of the pass device to the load. The switch may be controlled by a power enable control signal, which may be provided by other circuitry, for example processor circuitry that determines when the load should be provided power. With the switch in the open position, no power is applied to the load from the LDO power regulator. Conversely, with the switch in the closed position, power is applied to the load from the LDO power regulator. As with the device of FIG. 1A, in various embodiments the switch may be otherwise positioned or implemented, with for example in some embodiments the "switch" or its control signal disabling various portions of the LDO power regulator, for example the error amplifier.

Compared to FIG. 1A, the device of FIG. 2 additionally includes a bypass device 211. The bypass device is coupled between the source of power and the load, in parallel to the pass device 113. The bypass device is configured to provide power to the load, to increase a slew rate of provision of power to the load during transient conditions. In some embodiments the bypass device includes a bypass switch, coupled between the source of power and the load, and a digital control to operate the bypass switch.

In some embodiments the digital control receives a signal indicative of voltage applied to the load, and includes at least one logic gate having a threshold level set such that the logic gate will transition states when the signal indicative of voltage applied to the load crosses over some percentage (less than 100%) of the predetermined desired voltage to be applied to the load. In some embodiments the at least one logic gate has a threshold level of nominally 50% of the predetermined desired voltage to be applied to the load. In some embodiments the digital control commands the bypass switch to be closed when the at least one logic gate indicates that the signal indicative of voltage applied to the load is less than the threshold level. In some embodiments, the digital control also receives the power enable control signal, and the digital control is configured to only command the bypass switch to be closed when both the power enable control signal indicates power should be applied to the load and the at least one logic gate indicates that the signal indicative of voltage applied to the load is less than the threshold level. In some embodiments the digital control may include further enable/disable logic circuitry as well.

In FIG. 2, the bypass device is shown as receiving a $V_{ctrl}$ line, corresponding to the power enable control signal, and a $V_{sns}$ line, which is coupled to the load and is therefore the voltage applied to the load. The bypass device is coupled to $V_{dda}$, and is also provided a further power signal $V_{LDO}$, which is the predetermined desired voltage to be applied to the load. This is to bias the at least one logic gate since its input is the $V_{sns}$ line, which is also referred to $V_{LDO}$. The bypass device of FIG. 2 is outside of the control loop of the LDO. This means it does not interfere with the LDO's loop dynamics which simplifies its design considerably. In operation, during large transient events, when the control switch closes, most of the current provided to the load is from the bypass device. Once the voltage applied to the load approaches the predetermined desired voltage, the bypass device ceases providing current to the load.

Figure 3:
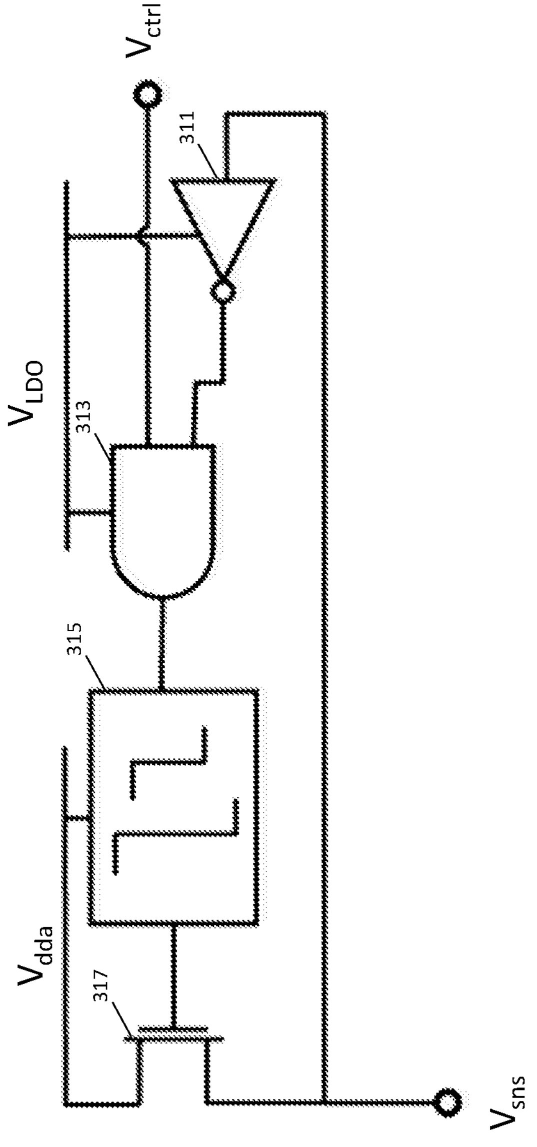
FIG. 3 is a semi-block diagram, semi-schematic of an embodiment of a bypass switch with digital control, for use with an LDO power regulator, in accordance with aspects of the invention.

FIG. 3 is a semi-block diagram, semi-schematic of an embodiment of a bypass switch and digital control, for use with an LDO power regulator. In some embodiments the bypass switch and digital control of FIG. 3 are used for the bypass device of FIG. 2.

In FIG. 3, the bypass switch 317 is shown as a transistor with its drain coupled to $V_{dda}$ and its source coupled to $V_{sns}$. $V_{dda}$ is a source of power, for example the source of power discussed with respect to FIG. 2. $V_{sns}$ may be coupled to a load, for example as discussed with respect to FIG. 2. A gate of the transistor is coupled to logic circuitry, to allow for operation of the bypass switch when power is enabled to the load and voltage applied to the load is below a predetermined level.

The logic circuitry includes an inverter and an AND gate. $V_{sns}$ is coupled to an input of an inverter 311. The inverter is shown as receiving power from a $V_{LDO}$ line, since its input, the $V_{sns}$ line, is also referred to $V_{LDO}$. The inverter therefore has a nominal switching threshold of ½ $V_{LDO}$, and will output a logic high signal when voltage applied to the load is less than ½ $V_{LDO}$. In this regard, it is noted that the $V_{LDO}$ line providing power may be providing a voltage present at a top of the pull-down resistor 119. It has been found the voltage at that point may not droop significantly upon the occurrence of a large transient event due to the control switch closing, as most of the current to the load CL comes from the bypass switch, for example as shown in FIG. 4.

The AND gate is shown as having the output of the inverter and a $V_{ctrl}$ signal as its inputs. The $V_{ctrl}$ signal corresponds to the power enable control signal. Accordingly, the AND get will output a logic high when the inverter indicates the voltage applied to the load is less than half of the predetermined desired voltage to be applied to the load and power to the load is enabled. The AND gate is also shown as receiving power from the $V_{LDO}$ line, since it receives an input from the $V_{LDO}$ referred inverter.

Output of the AND gate is level shifted to $V_{dda}$ since it is applied to the gate of the bypass switch, which is supplied by $V_{dda}$. In FIG. 3, a level shifter 315, which is supplied by $V_{dda}$, level shifts the output of the AND gate. The output of the level shifter is provided to the gate of the transistor of the bypass switch 317. In some embodiments the level shifter may instead be placed in the signal path between the inverter and the AND gate, with the AND gate referred to (supplied by) $V_{dda}$. In such embodiments, preferably $V_{ctrl}$ would also be referred to $V_{dda}$, and not $V_{LDO}$, as well.

Figure 4:
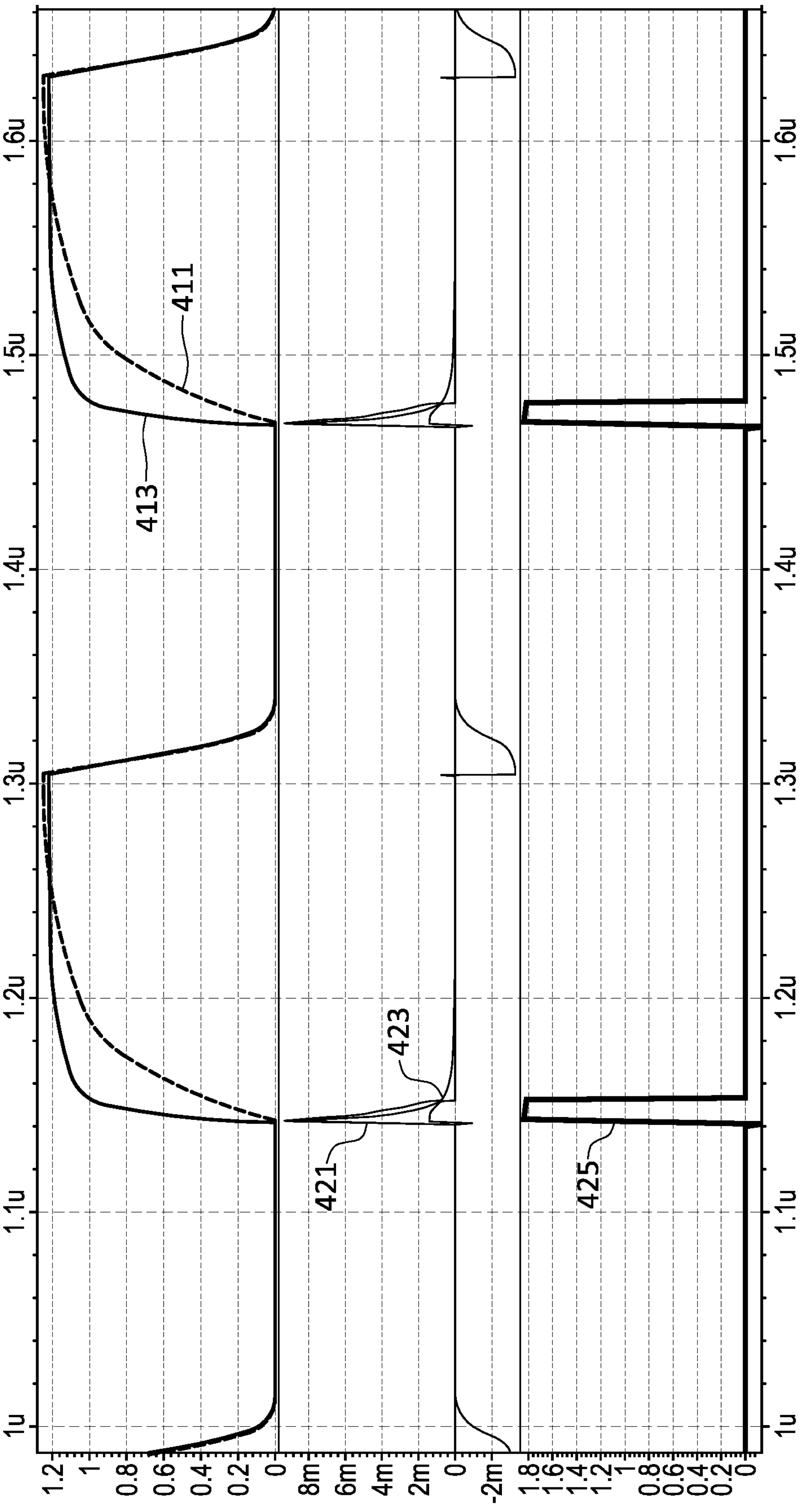
FIG. 4 are charts illustrating simulation results for an embodiment of an LDO power regulator with a digitally controlled bypass switch.

FIG. 4 are charts illustrating simulation results for an embodiment of an LDO power regulator with a digitally controlled bypass switch. The charts are with respect to a common time period. The LDO power regulator with a digitally controlled bypass switch may be the device of FIG. 2, with the digital control of FIG. 3.

A top third of the charts of FIG. 4 shows simulation results for providing power to a 50 pF load, using an LDO with a peak current of approximately 0.5 mA and a desired voltage of 1.2 V to be applied to the load. A first line 411 shows voltage applied to the load, over time, with an LDO power regulator without a bypass device, for example the LDO power regulator of FIG. 1A. A second line 413 shows voltage applied to the load, over time, with an LDO power regulator with a bypass device, for example the LDO power regulator of FIG. 2. Both lines show a rise from 0 V to 1.2 V, but the second line 413 exhibits a much greater slew rate than the first line 411.

In addition, a middle third of the charts of FIG. 4 shows current provided to the load over time. A first line 423 of the chart shows current provided by an LDO regulator of FIG. 2, while a second line 421 of the chart shows current provided by the bypass device of FIG. 2. The chart shows that a large percentage of the current initially provided to the load is due to the bypass switch.

Finally, a bottom third of the charts of FIG. 4 shows a control signal 425 applied to the bypass switch over time. Comparison, with respect to time, of the control signal 425 with the second line 421 showing current provided by the bypass device, indicates that the bypass switch is only closed when needed.

Figure 5:
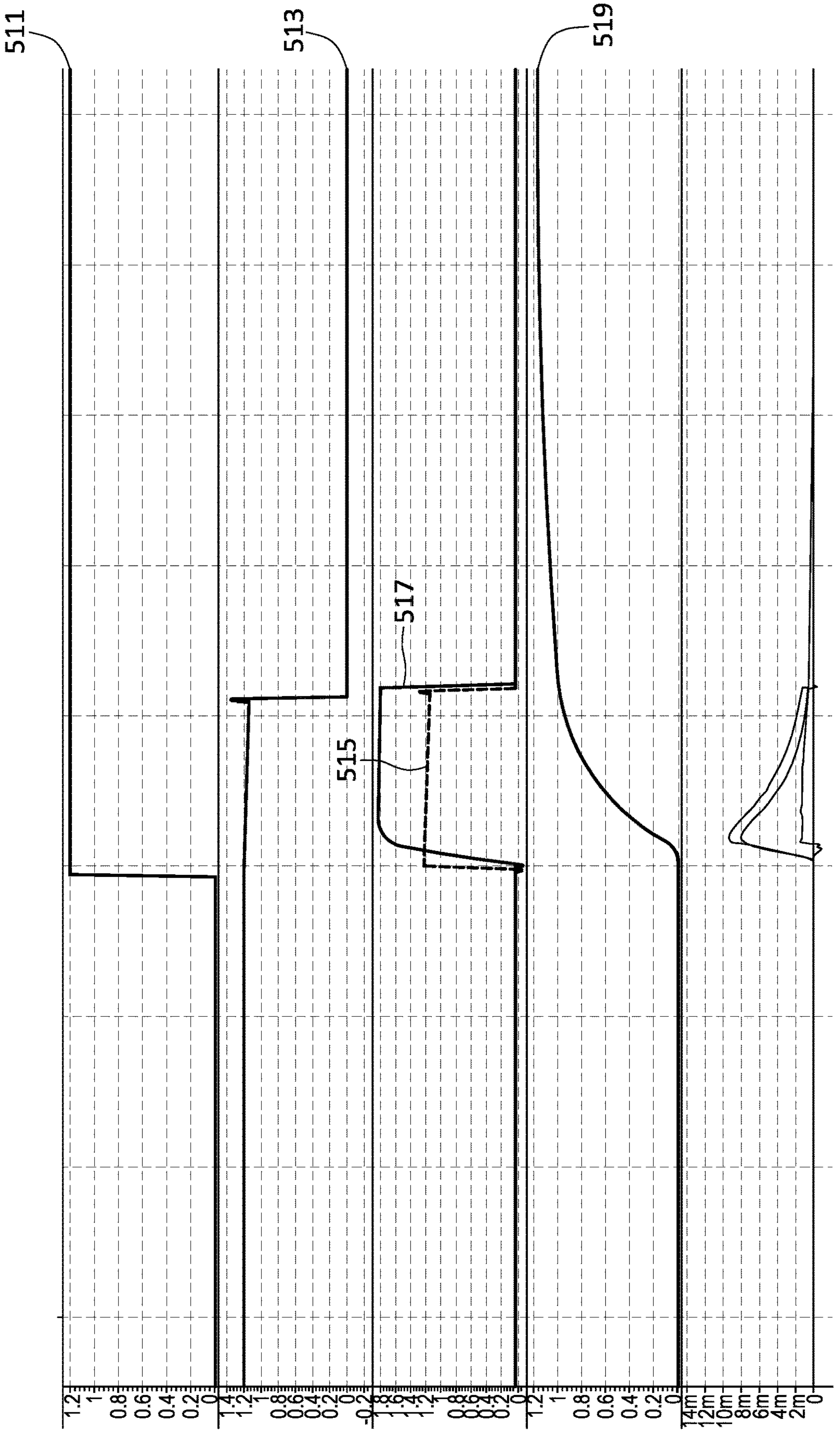
FIG. 5 are charts showing waveforms associated with the digitally controlled bypass switch.

FIG. 5 are charts showing waveforms associated with the LDO power regulator with a digitally controlled bypass switch. The charts are with respect to a common time period.

The LDO power regulator with a digitally controlled bypass switch may be the device of FIG. 2, with the digital control of FIG. 3.

A first line 511 shows a $V_{ctrl}$ signal, starting out low and transitioning to a high state. The $V_{ctrl}$ signal corresponds to a signal indicating that power to the load should be enabled. A second line 519 shows voltage applied to the load. The voltage applied to the load begins ramping up once the control signal goes high. A third line 513 shows output of the inverter of FIG. 3. The output of the inverter starts out high, indicating that voltage applied to the load is less than the predetermined desired voltage to be applied to the load. The output of the inverter stays high until the voltage applied to the load reaches a level close to the predetermined desired voltage, some time after the $V_{ctrl}$ signal goes high. A third line 515 shows an output of the AND gate of FIG. 3, with a fourth line showing a level shifted version of the AND gate.

Although the invention has been discussed with respect to various embodiments, it should be recognized that the invention comprises the novel and non-obvious claims supported by this disclosure.

Although the invention has been discussed with respect to various embodiments, it should be recognized that the invention comprises the novel and non-obvious claims supported by this disclosure.

What is claimed is:

1. A linear drop out (LDO) power regulator with digitally controlled slew rate enhancement, comprising:

an LDO power regulator including a control and a pass device, the pass device coupled between a source of power and a load, the control configured to operate the pass device based on comparing a first signal indicative of a voltage applied to the load by the pass device to a reference voltage;

a bypass switch coupled between the source of power and the load, in parallel to the pass device; and a digital control including logic gates having threshold values based on a predetermined desired voltage to be applied to the load, at least one of the logic gates configured to receive a signal from a node between the pass device and the load, the digital control configured to operate the bypass switch based on a second signal indicative of the voltage applied to the load being below a threshold level of the predetermined desired voltage to be applied to the load.

2. The LDO power regulator of claim 1, wherein the first signal indicative of voltage applied to the load and the second signal indicative of voltage applied to the load are the same signal.

3. The LDO power regulator with digitally controlled slew rate enhancement of claim 1, wherein the control is additionally configured to operate the pass device to apply a predetermined desired voltage to the load, and wherein the digital control includes logic gates having threshold values based on the predetermined desired voltage.

4. The LDO power regulator with digitally controlled slew rate enhancement of claim 3, wherein the digital control includes logic gates having threshold values of nominally half of the predetermined desired voltage.

5. The LDO power regulator with digitally controlled slew rate enhancement of claim 3, wherein at least one of the logic gates is configured to receive the signal from the node between the pass device and the load.

6. The LDO power regulator with digitally controlled slew rate enhancement of claim 5, wherein the at least one of the logic gates is an inverter.

7. The LDO power regulator with digitally controlled slew rate enhancement of claim 6, wherein the bypass switch comprises at least one transistor, operation of the transistor being based on operation of the logic gates.

8. The LDO power regulator with digitally controlled slew rate enhancement of claim 7, further comprising a level shifter, the level shifter in a signal pathway between the logic gates and the at least one transistor.

9. The LDO power regulator with digitally controlled slew rate enhancement of claim 8, wherein the level shifter comprises at least one logic gate with a threshold value based on a voltage level of the source of power.

10. The LDO power regulator with digitally controlled slew rate enhancement of claim 3, wherein provision of power from the LDO power regulator to the load is enabled by a power enable control signal, and the digital control to operate the bypass switch is further configured to operate the pass device based on the power enable control signal.

11. A linear drop out (LDO) power regulator with digitally controlled slew rate enhancement, comprising:

an LDO power regulator including a pass device and control circuitry, the pass device to be coupled between a source of power and a load, the error amplifier coupled to an output of the pass device and reference voltage circuitry, the control circuitry configured to operate the pass device based on a difference between a signal provided by the reference voltage circuitry and a signal based on the output of the pass device;

a bypass switch, to be coupled between the source of power and the load, in parallel to the pass device, an output of the bypass switch being coupled to an output of the pass device; and a digital control to operate the bypass switch, the digital control including at least one logic gate having a threshold value based on a predetermined desired voltage to be applied to the load, with an input coupled to the output of the bypass switch, the digital control configured to operate the bypass switch based on an output of the at least one logic gate being below a threshold level of the predetermined desired voltage to be applied to the load.

12. The LDO power regulator with digitally controlled slew rate enhancement of claim 11, wherein the at least one logic gate is coupled for biasing to a different power source line different from the source of power to be coupled to the bypass switch.

13. The LDO power regulator with digitally controlled slew rate enhancement of claim 12, wherein the at least one of the logic gates is an inverter.

14. The LDO power regulator with digitally controlled slew rate enhancement of claim 13, further comprising a level shifter, the level shifter in a signal pathway between the inverter and bypass switch.

15. The LDO power regulator with digitally controlled slew rate enhancement of claim 14, wherein the bypass switch comprises at least one transistor, a gate of the at least one transistor coupled to an output of the level shifter.

16. The LDO power regulator with digitally controlled slew rate enhancement of claim 14, further comprising an AND gate in a signal path between the inverter and the bypass switch, the AND gate having a first input coupled to a power enable control line and a second input coupled to an output of the inverter.

17. The LDO power regulator with digitally controlled slew rate enhancement of claim 16, wherein the AND gate is coupled for biasing to a different power source line different from the source of power to be coupled to the bypass switch, and the AND gate precedes the level shifter in the signal path between the inverter and the bypass switch.

18. The LDO power regulator with digitally controlled slew rate enhancement of claim 17, wherein the level shifter includes at least one transistor coupled for biasing to a same power source line as the bypass switch.

* * * * *